(12) United States Patent
Sasahara et al.

(10) Patent No.: US 7,727,665 B2
(45) Date of Patent: Jun. 1, 2010

(54) FUEL CELL ASSEMBLY, SEPARATOR-DIFFUSION LAYER ASSEMBLY FOR FUEL CELL ASSEMBLY AND MANUFACTURING METHOD THEREFOR

(75) Inventors: Jun Sasahara, Wako (JP); Toshifumi Suzuki, Wako (JP); Tadahiro Kubota, Wako (JP); Nariaki Kuriyama, Wako (JP); Yuji Saito, Mountain View, CA (US)

(73) Assignee: Honda Motor Co., Ltd, Tokyo (JP)

( * ) Notice: Subject to any disclaimer, the term of this patent is extended or adjusted under 35 U.S.C. 154(b) by 1606 days.

(21) Appl. No.: 10/979,376

(22) Filed: Oct. 28, 2004

(65) Prior Publication Data

US 2005/0175888 A1 Aug. 11, 2005
US 2009/0035645 A9 Feb. 5, 2009

Related U.S. Application Data

(63) Continuation of application No. PCT/JP03/05631, filed on May 2, 2003.

(60) Provisional application No. 60/379,524, filed on May 9, 2002.

(51) Int. Cl.
H01M 8/02 (2006.01)
H01M 4/86 (2006.01)

(52) U.S. Cl. .............................. 429/44; 429/38; 429/39
(58) Field of Classification Search .................. None
See application file for complete search history.

(56) References Cited

U.S. PATENT DOCUMENTS

| 5,683,828 | A | 11/1997 | Spear et al. |
| 5,976,726 | A | 11/1999 | Wilkinson et al. |
| 6,350,540 | B1 * | 2/2002 | Sugita et al. .................. 429/39 |
| 6,783,883 | B1 * | 8/2004 | Koschany ..................... 429/36 |
| 7,390,588 | B2 * | 6/2008 | Yamada et al. ................ 429/39 |

FOREIGN PATENT DOCUMENTS

| EP | 0330124 | | 8/1989 |
| EP | 0330124 | A2 | 8/1989 |
| EP | 1030393 | | 8/2000 |
| GB | 2336712 | | 10/1999 |
| JP | 61-127883 | | 6/1989 |
| JP | 7176307 | * | 7/1995 |
| JP | 7176307 | A | 7/1995 |
| JP | 8064216 | A | 3/1996 |
| JP | 8180884 | A | 7/1996 |
| JP | 11511289 | T | 9/1999 |
| JP | 2000058072 | A | 2/2000 |
| JP | 2000113899 | A | 4/2000 |
| WO | WO 01/37357 | | 5/2001 |

* cited by examiner

*Primary Examiner*—John S Maples
(74) *Attorney, Agent, or Firm*—Lumen Patent Firm (57) ABSTRACT

In a fuel cell assembly (100, 200), a diffusion layer (113, 114, 201) comprises an electroconductive film (133, 133a, 133b) formed integrally with a separator (115, 116, 115a) so as to form a unitary separator-diffusion layer assembly (130, 131, 130a, 203). The electroconductive film of the diffusion layer can be formed on the separator by a process comprising physical vapor deposition, chemical vapor deposition, spin coating, sputtering or screen printing.

6 Claims, 11 Drawing Sheets

Fig. 1

PRIOR ART

FUEL CELL ASSEMBLY, SEPARATOR-DIFFUSION LAYER ASSEMBLY FOR FUEL CELL ASSEMBLY AND MANUFACTURING METHOD THEREFOR

CROSS-REFERENCE TO RELATED APPLICATIONS

This application is a continuation of PCT International Application PCT/JP03/05631 filed on 05/02/2003, which claims priority from U.S. Provisional Application No. 60/379,524 filed on May 9, 2002.

TECHNICAL FIELD

The present invention relates to a fuel cell assembly. Particularly, the present invention relates to a compact fuel cell assembly that can be used in place of a battery or the like, a separator-diffusion layer assembly for such a fuel cell assembly and a manufacturing method therefor.

BACKGROUND OF THE INVENTION

A fuel cell comprises an electrolyte layer and a pair of catalyst carrying electrodes (referred to as catalyst electrode layers) placed on either side of the electrolyte layer, and generates electricity through an electrochemical reaction between fuel fluid such as hydrogen or alcohol and oxidizing fluid such as oxygen or air, which are supplied to the corresponding catalyst electrode layers, with the aid of the catalyst.

Figure 1:
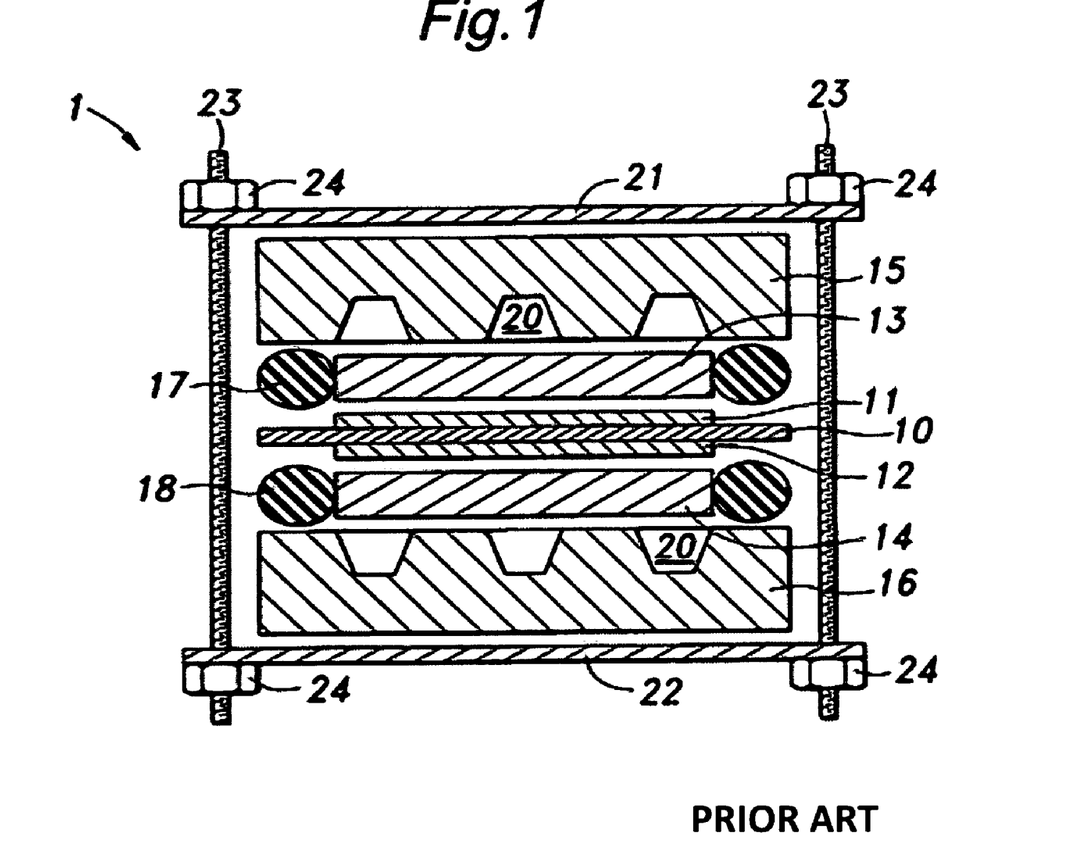
FIG. 1 is a schematic cross-sectional view for showing a conventional embodiment of a fuel cell assembly.

FIG. 1 shows a conventional embodiment of a fuel cell assembly. As shown, this fuel cell assembly 1 comprises an electrolyte layer 10, a pair of catalyst electrode layers 11, 12 disposed on either side of the electrolyte layer 10, a pair of diffusion layers 13, 14 disposed on either outer side of the catalyst electrode layers 11, 12, and a pair of separators (or flow distribution plates) 15, 16 disposed on either outer side of the diffusion layers 13, 14. The separators 15, 16 can be formed by etching a silicon substrate, for example, and formed with channels (or recesses) 20 for defining a flow passage for a fuel fluid (e.g., hydrogen gas) or an oxidizing fluid (e.g., oxygen gas) in their surface facing the diffusion layers 13, 14. The diffusion layers 13, 14 are provided to diffuse the fluids evenly over the electrolyte layer 10 as well as to contact the catalyst electrode layers 11, 12 to thereby transmit electric potential of the electrode layers 11, 12 to outside, and typically formed of an electroconductive porous material such as a carbon paper or a carbon cloth. When the separators 15, 16 are made of an electroconductive material or an insulating or high-resistance material covered with an electroconductive film, external electrodes may be attached to the separators 15, 16. Further, in order to prevent undesirable leakage of the fluids, seal members 17, 18 are disposed between the electrolyte layer 10 and the separators 15, 16 so as to surround the diffusion layers 13, 14.

The fuel cell assembly 1 is formed by stacking these component parts and applying a tightening force on them in the stacking direction so that the adjacent component parts are closely pressed to each other. For this purpose, a pair of backing plates 21, 22 are provided on either outer side of the separators 15, 16, a plurality of rods 23 extend through the backing plates 21, 22, and nuts 24 are engaged with threaded ends of the rods 23 so that the rotation of the nuts 24 can produce the pressure in the stacking direction. A required tightening pressure can be varied for different combinations of component parts to be pressed together. However, it should be noted that because the diffusion layers 13, 14 made of a carbon paper/cloth or the like have a rough surface, a particularly large contact pressure is needed between the diffusion layers 13, 14 and the separators 15, 16 in order to prevent the fluids from leaking as they pass through the diffusion layers 13, 14. Also, when the separators 15, 16 are formed of an electroconductive material such as a metal or the surface of the separators 15, 16 is covered with an electroconductive film to thereby allow the voltage of the diffusion layers 13, 14 to be transmitted to outside through the separators 15, 16, it is required to make the diffusion layers 13, 14 and the separators 15, 16 contact each other with a large pressure in order to reduce the contact resistance therebetween.

However, in order for the diffusion layers 13, 14 and the separators 15, 16 to stand the large pressure, they need to have a high mechanical strength, which could lead to a larger component size and/or higher manufacturing cost. Further, in the above structure, the tightening force applied to the separators 15, 16 and the diffusion layers 13, 14 is also imposed on other component parts which may not require such a large tightening pressure, and therefore these component parts also need to have a high mechanical strength. The large tightening force also tends to necessitate a bulky tightening structure (i.e., backing plates 21, rods 23 and nuts 24). These factors can undesirably increase the weight, volume and manufacturing cost of the fuel cell assembly 1.

The electrolyte of the electrolyte layer 10 may consist of a solid polymer electrolyte (SPE). However, the SPE can function as an ion conducting membrane only when impregnated with water, and the SPE when impregnated with water significantly increases its volume. The volume of the SPE can also change depending on the temperature. Such volume increase of the SPE can generate stress inside the fuel cell assembly 1. Therefore, when the externally applied tightening force is large, the pressure applied to the component parts may become excessively high, which can cause a problem such as breaking the seal members 17, 18. Controlling the pressure at a constant level would result in an undesirably complicated operation.

Generally, in the fuel cell assembly 1, it is preferable that the diffusion layers 13, 14 have high electric conductivity to effectively conduct the potential of the catalyst electrode layers 11, 12 to outside. Also, a smaller surface roughness of the diffusion layers 13, 14 is preferred to lower the contact resistance between them and the adjoining component parts (e.g., catalyst electrode layers 11, 12 or separators 15, 16). Further, so long as a favorable diffusion capacity is achieved, thinner diffusion layers 13, 14 are preferred to achieve a smaller (thinner) fuel cell assembly 1. However, in the conventional diffusion layers 13, 14 made of a carbon paper or carbon cloth, there has been a limit to the increase in the conductivity as well as reduction in the thickness and surface roughness.

BRIEF SUMMARY OF THE INVENTION

In view of such problems of the prior art, a primary object of the present invention is to provide a fuel cell assembly that can eliminate the need for applying a large tightening pressure to the separators and the diffusion layers in the assembled state.

A second object of the present invention is to provide a fuel cell assembly comprising a diffusion layer having a reduced surface roughness to thereby decrease the contact resistance between the diffusion layer and its adjoining component part.

A third object of the present invention is to provide a fuel cell assembly comprising a diffusion layer having an increased conductivity.

A fourth object of the present invention is to provide a fuel cell assembly comprising a diffusion layer having a substantially smaller thickness than the conventional diffusion layer while maintaining a favorable diffusing function.

A fifth object of the present invention is to provide a separator-diffusion layer assembly suitable for use in such a fuel cell assembly and to provide a method for manufacturing such a separator-diffusion layer assembly.

According to the present invention, such objects can be accomplished by providing a fuel cell assembly (100, 200), comprising: an electrolyte layer (110); a pair of catalyst electrode layers (111, 112) interposing the electrolyte layer therebetween; a pair of separators (115, 116) each having a first surface facing the electrolyte layer and a second surface opposite to the first surface, the first surface of each separator being provided with a recess (120) through which a fuel fluid or an oxidizing fluid flows to contact an associated one of the catalyst electrode layers; and a pair of diffusion layers (113, 114) each being disposed between the first surface of an associated one of the separators and an associated one of the catalyst electrode layers, wherein each of the diffusion layers comprises an electroconductive film (133, 133a, 133b) formed integrally with the associated separator so as to form a separator-diffusion layer assembly (130, 131, 130a, 203) in cooperation with the associated separator, and wherein each diffusion layer is formed with a plurality of fluid paths (125, 125a, 125b, 157) extending therethrough in a direction of its thickness so as to be in flow communication with the recess of the associated separator and thereby diffuse the fluid flowing in the recess over a surface of the associated catalyst electrode layer.

Thus, by integrally forming the diffusion layer on the separator to constitute a separator-diffusion layer assembly, it is possible to eliminate the need for applying a large pressure on the diffusion layer and the separator to achieve close contact therebetween, and therefore, the tightening pressure externally applied to the fuel cell assembly can be considerably reduced. This can reduce the mechanical strength required to the component parts of the fuel cell assembly to thereby decrease the manufacturing cost thereof. Further, the influence of the stress that may be caused by expansion of the electrolyte layer in operation can be moderated, which eliminates the need for controlling the tightening pressure and thus can simplify the operation. The integrated diffusion layer and the separator also result in a smaller number of component parts and assembly steps.

The electroconductive film of each diffusion layer can be preferably formed on the associated separator by a process comprising physical vapor deposition (PVD), chemical vapor deposition (CVD), spin coating, sputtering or screen printing. By using such a film forming process used in a semiconductor or micromachine manufacture in forming the electroconductive film of the diffusion layer, it is possible to form a very thin electroconductive film, which contributes to minimizing the dimension (thickness) of the resulting fuel cell assembly. The reduced thickness of the fuel cell assembly is preferred particularly when a plurality of such fuel cell assemblies are stacked together to form a series connection because the thickness of the resulting fuel cell stack can be also minimized. Further, the diffusion layers can have a high electric conductivity when the electroconductive film thereof is made of a highly electroconductive material such as a metal or an alloy.

Each separator preferably comprises a silicon substrate or a glass substrate. The silicon substrate or glass substrate for use in semiconductor manufacture or the like has a very low surface roughness, and the diffusion layer formed thereon can readily assume a very low surface roughness in its surface facing the catalyst electrode layer. This not only can reduce the contact resistance between the diffusion layer and the catalyst electrode layer, but also can maintain the contact resistance substantially constant irrespective of the tightening pressure.

The plurality of fluid paths of each diffusion layer may comprise a plurality of openings (125) formed in the electroconductive film of the diffusion layer over the recess of the associated separator. Alternatively, each diffusion layer may comprise a plurality of electroconductive films (133, 133a, 133b) wherein each of the plurality of electroconductive films is formed with a plurality of openings (125, 125a, 125b) in such a manner that the openings of each electroconductive film are in flow communication with the openings of its adjacent electroconductive film(s) to form the plurality of fluid paths of the diffusion layer. When the recess of each separator extends in a prescribed direction, it will be preferable if the plurality of openings of the electroconductive film associated with each separator are arranged in a direction of extension of the recess to form a line of openings in such a manner that adjacent openings in the line of openings partially overlap each other in a direction of extension of the line of openings. In this way, the recess extending along the direction of arrangement of the openings can be obtained without a complicated process by just etching a substrate made of an inorganic material such as silicon using the openings as etching windows.

In order to enhance the mechanical strength of the diffusion layers, each diffusion layer may preferably comprise a structure reinforcement member (132) disposed between the electroconductive film and the associated separator. In the case that each separator comprises a silicon substrate, the structure reinforcement member can consist of a silicon nitride layer or a silicon oxide layer. The plurality of fluid paths of each diffusion layer may comprise a plurality of openings formed in the structure reinforcement member of the diffusion layer. In other words, the openings in the structure reinforcement members can contribute to evenly diffusing the fuel fluid and oxidizing fluid over the surfaces of the catalyst electrode layers. When the recess of each separator extends in a prescribed direction, it will be preferable if the plurality of openings of the structure reinforcement member associated with each separator are arranged in a direction of extension of the recess to form a line of openings in such a manner that adjacent openings in the line of openings partially overlap each other in a direction of extension of the line of openings. In this way, the recess extending along the direction of arrangement of the openings can be obtained without a complicated process by just etching a substrate made of an inorganic material such as silicon using the openings as etching windows.

According to another aspect of the present invention, there is provided a separator-diffusion layer assembly (130, 131, 130a, 203) for a fuel cell assembly, comprising: a separator (115, 116, 115a) having a first surface formed with a recess (120) through which a fuel fluid or an oxidizing fluid flows and a second surface opposite to the first surface, and a diffusion layer (113, 114, 201) provided on the first surface of the separator, wherein the diffusion layer comprises an electroconductive film (133, 133a, 133b) formed integrally with the separator and is formed with a plurality of fluid paths (125, 125a, 125b) extending through the diffusion layer in a direction of its thickness so as to be in flow communication with the recess of the separator and thereby diffuse the fluid in the recess on a side of a surface of the diffusion layer facing away from the first surface of the separator.

According to yet another aspect of the present invention, a method for manufacturing a separator-diffusion layer assembly of a fuel cell assembly, comprising the steps of: forming a diffusion layer (113, 114, 201) on a surface of a substrate (150) consisting of an inorganic material, wherein the diffusion layer has an electroconductive film (133, 133a, 133b) formed integrally with the substrate and is provided with a plurality of fluid paths (125, 125a, 125b) extending through the diffusion layer in a direction of its thickness; and bringing an etchant into contact with the surface of the substrate through the fluid paths of the diffusion layer to form a recess (120) in the surface of the substrate for allowing a fuel fluid or an oxidizing fluid to flow therethrough and whereby make a separator (115, 116, 115a).

Thus, by allowing the etchant to reach the surface of the substrate through the fluid paths formed in the diffusion layer, it is possible to process the substrate and form the recess defining a passage for the fuel fluid or oxidizing fluid without complicated machining. Preferably, the step of forming a diffusion layer comprises a step of forming the electroconductive film on the surface of the substrate by a process comprising physical vapor deposition (PVD), chemical vapor deposition (CVD), spin coating, sputtering or screen printing.

Also preferably, the step of forming a diffusion layer may comprise the step of forming a plurality of openings (125) in the electroconductive film, wherein the fluid paths of the diffusion layer comprise the plurality of openings formed in the electroconductive film, and the plurality of openings of the electroconductive film are arranged to form one or more lines of openings in such a manner that adjacent openings in each line of openings partially overlap each other in a direction of extension of the line of openings. Alternatively or in addition, the step of forming a diffusion layer may comprise the steps of: forming a structure reinforcement member (132) between the substrate and the electroconductive film; and forming a plurality of openings in the structure reinforcement member, wherein the fluid paths of the diffusion layer comprise the plurality of openings formed in the structure reinforcement member, and the plurality of openings of the structure reinforcement member are arranged to form one or more lines of openings in such a manner that adjacent openings in each line of openings partially overlap each other in a direction of extension of the line of openings. In this way, it is possible to form a recess(es) extending along the line(s) of openings of the electroconductive film or of the structure reinforcement member can be readily formed in the substrate by etching.

Other and further objects, features and advantages of the invention will appear more fully from the following description.

BRIEF DESCRIPTION OF THE DRAWINGS

Now the present invention is described in the following with reference to the appended drawings, in which:

FIG. 10b is a cross-sectional view taken along the line Xb-Xb in FIG. 10a;

DETAILED DESCRIPTION OF THE PREFERRED EMBODIMENTS

Figure 2:
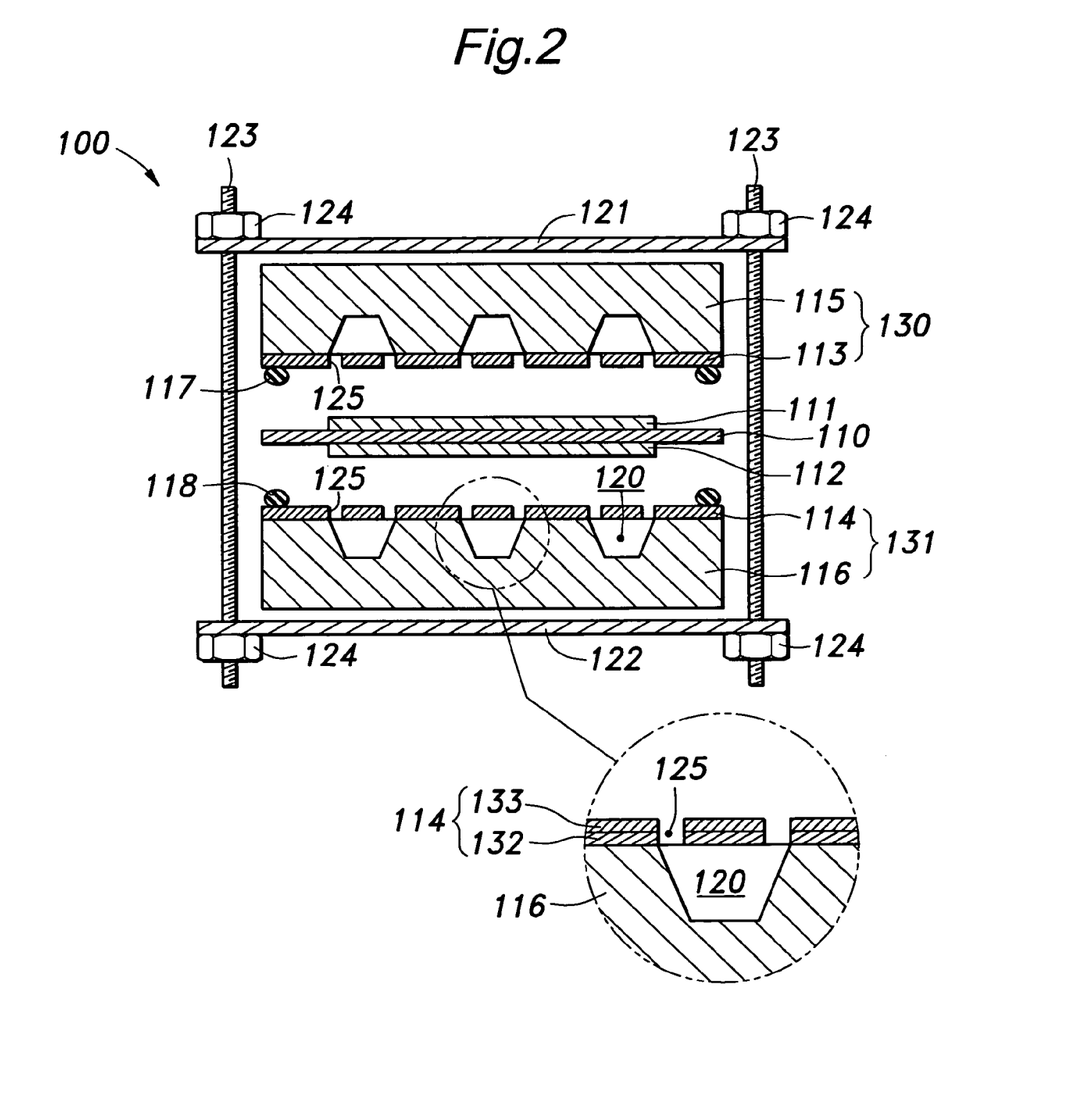
FIG. 2 is a schematic cross-sectional view for showing a preferred embodiment of a fuel cell assembly according to the present invention.

FIG. 2 is a schematic cross-sectional view showing a preferred embodiment of a fuel cell assembly according to the present invention. Similar to the conventional fuel assembly 1, this fuel cell assembly 100 comprises a centrally disposed electrolyte layer 110, a pair of catalyst electrode layers 111, 112 disposed on either side of the electrolyte layer 110, a pair of separators 115, 116 made of an inorganic material such as silicon or glass and defining fluid passages (recesses) 120 for a fuel fluid or oxidizing fluid in a surface facing the catalyst electrode layers 111, 112, seal members 117, 118 disposed between the electrolyte layer 110 and the separators 115, 116, and backing plates 121, 122, rods 123 and nuts 124 for providing a tightening pressure when assembling together the component parts. Though not shown in the drawing, the fluid passages 120 are each provided with a fluid port(s) in its bottom for allowing entrance and discharge of the fluid into and out of the fluid passage 120.

This fuel cell assembly 100 differs from the conventional fuel cell assembly 1 of FIG. 1 in a sense that a pair of diffusion layers 113, 114 for diffusing the fluids evenly over the electrolyte layer 110 as well as contacting the catalyst electrode layers 111, 112 to transmit the electric potential of these catalyst electrode layers 111, 112 to outside are formed integrally with the associated separators 115, 116 to thereby constitute separator-diffusion layer assemblies 130, 131, respectively. The diffusion layers 113, 114 are formed with a plurality of small openings 125 extending in a direction of thickness thereof so as to be in flow communication with the fluid passages 120 of the associated separators 115, 116 and thus diffusing the fluids in the fluid passages 120 over the surface of the associated catalyst electrode layers 111, 112.

As shown in a partial enlarged cross-sectional view in FIG. 2, each diffusion layer 113, 114 preferably comprises a structure reinforcement member 132 formed on the associated separator 115, 116 and an electroconductive film 133 formed on the structure reinforcement member 132. When the separators 115, 116 are made of single crystal silicon, for example, the structure reinforcement member 132 can consist of a silicon nitride film or silicon oxide film deposited on the surface of the separators 115, 116. As described in detail later, the electroconductive film 133 can be formed by a film forming process used in a semiconductor manufacturing or micromachine manufacturing processes such as physical vapor deposition (PVD), chemical vapor deposition (CVD), spin coating, etc. The small openings 125 can be formed by patterning the structure reinforcement member 132 and electroconductive film 133 by etching, for example.

Figure 3:
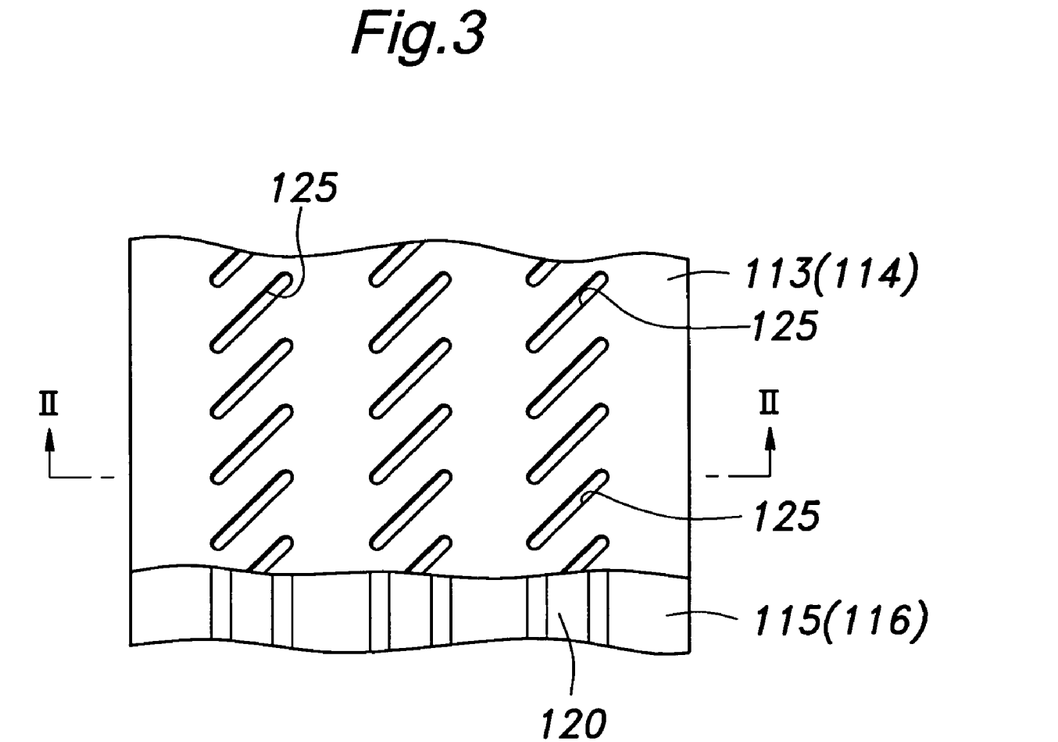
FIG. 3 is a partial plan view of the separator-diffusion layer assembly of the fuel cell assembly shown in FIG. 2.

FIG. 3 is a partial plan view showing a surface (first surface) of the separator-diffusion layer assembly 130 (131) that is formed with the diffusion layer 113 (114). In this drawing, the diffusion layer 113 (114) is shown with a part thereof broken away to show the fluid passages 120 in the separators 115 (116). As shown, the openings 125 formed in the diffusion layer 113 (114) are arranged along the extension of the fluid passages 120 of the separator 115 (116). Each opening 125 has an elongated shape and is inclined with respect to the direction of extension of the fluid passages 120 so that the openings 125 adjoining in the direction of extension of the fluid passages 120 partially overlap each other. It should be noted that FIG. 2 shows a cross-section along the lines II-II in FIG. 3, and thus shows two partially overlapping openings 125 over each fluid passage 120. However, the number and position of the openings 125 shown in the drawing may change depending on the position at which the cross-section is taken. Thus, by forming the plurality of openings 125 in the diffusion layer 113 (114) so that they are located over the fluid passages 120 to whereby supply the fuel fluid or oxidizing fluid in the fluid passages 120 to the catalyst electrode layer 111 (112) via the openings 125, it is possible to diffuse the fluids evenly over the catalyst electrode layer 111 (112). Moreover, as describe later, the openings 125 provided in the diffusion layer 113 (114) can be preferably used as etching windows when forming the fluid passages 120 in the separator 115 (116) by etching.

Similarly to the conventional embodiment, the fuel cell assembly 100 shown in FIG. 2 is formed by rotating the nuts 124 to thereby cause the adjoining component parts to closely contact with each other. However, because the diffusion layers 113, 114 and the separators 115, 116 are unified to constitute the separator-diffusion layer assemblies 130, 131 as described above, there is no need to impart a large pressure for achieving close contact between the diffusion layers 113, 114 and the separators 115, 116. Therefore, the tightening pressure externally applied to the fuel cell assembly 100 can be substantially reduced. This can reduce the mechanical strength required to the component parts of the fuel cell assembly 100 to thereby decrease the manufacturing cost thereof. Further, the influence of the stress that may be caused by expansion of the electrolyte layer 10 in operation can be moderated, which eliminates the need for controlling the tightening pressure and thus can simplify the operation. The integrated diffusion layers 113, 114 and the separators 115, 116 also result in a smaller number of component parts and assembly steps.

The electroconductive film 133 and the structure reinforcement member 132 can be formed by a film forming process used in semiconductor or micromachine manufacture, and therefore can be given a very small thickness, which in turn contributes to minimizing the size (thickness) of the fuel cell assembly 100. The reduced thickness of the fuel cell assembly 100 is preferred particularly when a plurality of such fuel cell assemblies 100 are stacked together to form a series connection because the thickness of the resulting fuel cell stack can be also minimized. The electroconductive film 133 of the diffusion layers 113, 114 can have a high electric conductivity when it is made of a highly electroconductive material such as a metal or an alloy.

Further, when the separators 115, 116 each consist of a silicon substrate or glass substrate having a very low surface roughness such as those for use in semiconductor devises, the diffusion layers 113, 114 formed thereon can also have a very low surface roughness in their surface facing the catalyst electrode layers 111, 112. This not only can reduce the contact resistance between the diffusion layers 113, 114 and the catalyst electrode layers 111, 112, but also can maintain the contact resistance substantially constant irrespective of the tightening pressure.

As is well known in this art, the electric polarity of the fuel cell assembly 100 is determined by the fluids supplied to the fluid passages 120. Specifically, the catalyst electrode layer 111, 112 (and the diffusion layer 113, 114 contacting it) contacting the fuel fluid such as hydrogen ($H_2$) constitutes an anode while catalyst electrode layer 111, 112 (and the diffusion layer 113, 114 contacting it) contacting the oxidizing fluid such as oxygen ($O_2$) constitutes a cathode. As shown in the schematic diagram of FIG. 4, external electrodes 134 may be attached to the diffusion layers 113, 114 directly.

Figure 4:
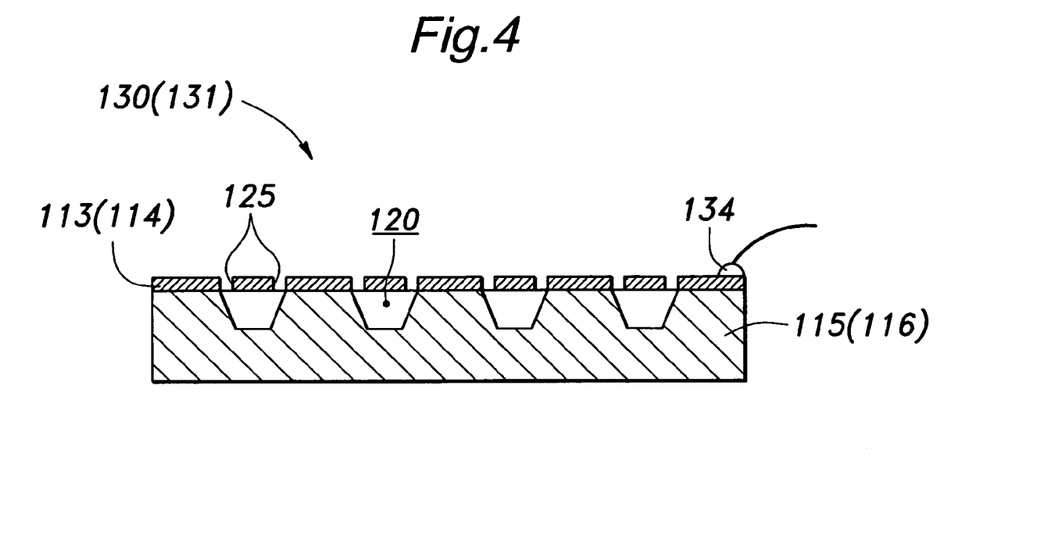
FIG. 4 is a schematic cross-sectional view of the separator-diffusion layer assembly for showing an example of connection between the diffusion layer and the external electrode in the fuel cell assembly of FIG. 2.
Figure 5:
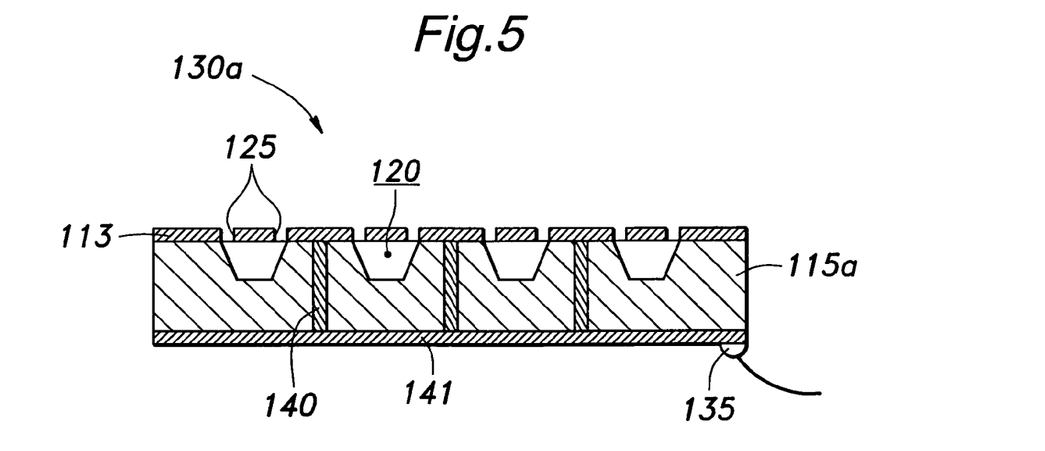
FIG. 5 is a schematic cross-sectional view for showing another embodiment of the separator-diffusion layer assembly according to the present invention.

FIG. 5 is a schematic cross-sectional view showing another embodiment of the separator-diffusion layer assembly according to the present invention. In this drawing, component parts similar to those in FIG. 4 are denoted with the same numerals. In this separator-diffusion layer assembly 130a, a separator 115a comprises electroconductive paths 140 passing therethrough, and an electroconductive film 141 is formed on a surface (outer or second surface) of the separator 115a opposite to the surface (first surface) on that the diffusion layer 113 is formed. The diffusion layer 113 (more specifically, its electroconductive film 133) and the electroconductive film 141 are connected to each other via the feedthrough conductive paths 140 whereby the electric potential of the diffusion layer 113 is transmitted to the electroconductive film 141 on the outer surface of the separator 115a. This can allow the external electrode 134 to be attached to the electroconductive film 141 on the outer surface of the separator 115a. When the fuel cell assembly utilizes the separator-diffusion layer assembly 130a of FIG. 5, series-connection of a plurality of such fuel cell assemblies can be readily achieved by just making the separator outer surfaces of adjoining fuel cell assemblies contact each other. The mechanically and electrically unified diffusion layer 113 and separator 115a can remove concern about the contact resistance therebetween and can make the resistance constant irrespective of the degree of the tightening pressure. Further, the feedthrough conductive paths 140 each provides a shortest path connecting the diffusion layer 113 to the electroconductive film 141 on the outer surface of the separator 115a, to thereby contribute to minimizing the internal resistance of the fuel cell assembly.

Referring to FIGS. 6a-7c, a preferred process for manufacturing the separator-diffusion layer assembly 130 (131) having the integrally formed separator 115 (116) and diffusion layer 113 (114) as shown in FIGS. 2-4 is described hereinafter.

Figure 6A:
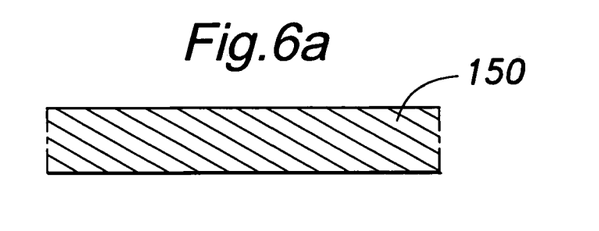
FIGS. 6a-6d are schematic partial cross-sectional views for showing a preferred method for manufacturing the separator-diffusion layer assembly of the fuel cell assembly shown in FIGS. 2-4.
Figure 6B:
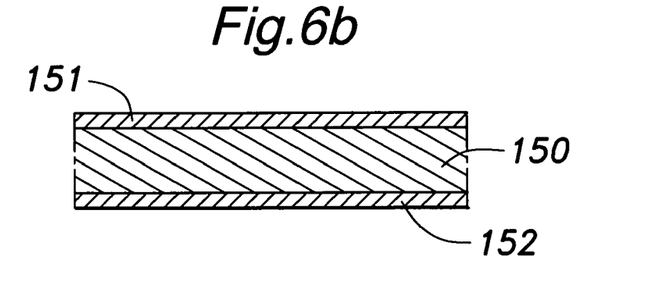

First, as shown in FIG. 6a, a substrate 150 consisting of single crystal silicon and having a thickness of about 400_m, for instance, is washed by using sulfuric acid or the like, and then, as shown in FIG. 6b, silicon nitride films 151, 152 of about 0.2_m thickness, for example, are formed on top and under surfaces of the substrate 150 by sputtering.

Figure 6C:
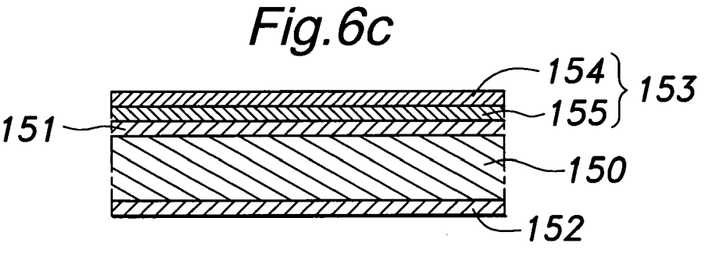

Then, as shown in FIG. 6c, an electroconductive film 153 of about 2_m thickness is formed on top of the substrate 150 by physical vapor deposition (PVD), for example. The electroconductive film 153 can preferably have a two-layered structure comprising a titanium (Ti) layer 155 having a thickness of about 0.1_m and a gold (Au) layer 154 of about 2_m formed thereon. Titanium improves the contact between the silicon nitride and gold, and may be substituted by aluminum (Al), nickel (Ni) or chromium (Cr). Gold may be substituted by other electroconductive material such as nickel (Ni), copper (Cu), platinum (Pt), iron (Fe), tungsten (W), molybdenum (Mo), doped silicon or polysilicon. Also, film forming processes other than the physical vapor deposition, such as chemical vapor deposition (CVD), spin coating, sputtering or screen printing may be used.

Figure 6D:
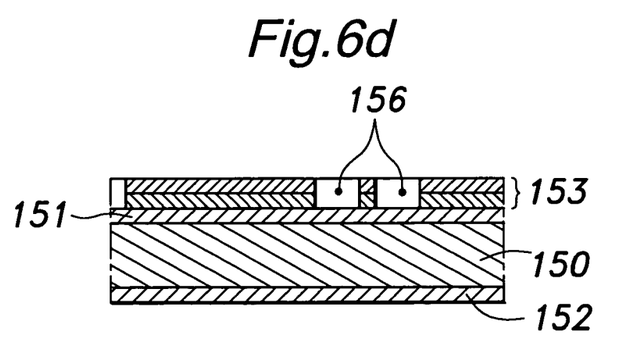

In the next step, as shown in FIG. 6d, etching is performed on the electroconductive film 153 to form a plurality of openings 156. Similarly to the openings 125 shown in FIG. 3, in order to form a plurality of parallel-extending fluid passages 159 (FIG. 7c) in the substrate 150, the openings 156 are arranged along a direction of extension of each fluid passage 159 (a direction vertical to the sheet of FIG. 6d) to form lines of openings 156. The openings 156 each have an elongated shape and are inclined with respect to the direction of arrangement of thereof so that in each line of openings 156, adjoining openings 156 overlap each other in the direction of arrangement. In the cross-sectional view of FIG. 6d, two openings 156 overlapping each other in the direction of arrangement are shown in a similar fashion as in FIG. 2.

Figure 7A:
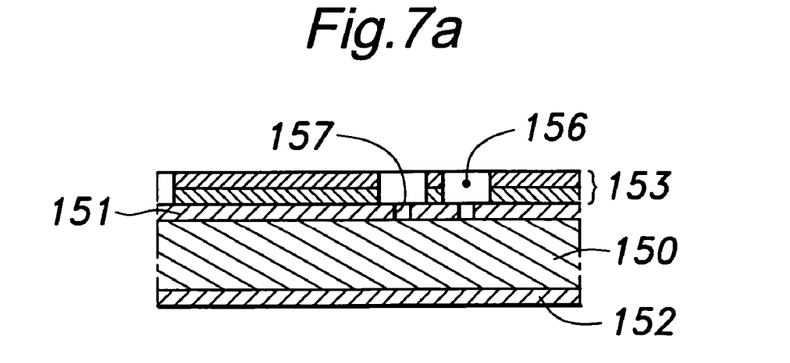
FIGS. 7a-7c are schematic partial cross-sectional views for showing a preferred method for manufacturing the separator-diffusion layer assembly of the fuel cell assembly shown in FIGS. 2-4.

Subsequently, as shown in FIG. 7a, reactive ion etching (RIE) using $CF_4$ is conducted with a mask (not shown) to form a plurality of small openings 157 in the silicon nitride film 151 on the top surface of the substrate 150 at positions aligned with the openings 156 of the electroconductive film 153. The openings 157 can serve as etching windows for forming the fluid passages 159 (FIG. 7c). Similarly to the openings 156 of the electroconductive film 153, the openings 157 each have an elongated shape and are inclined with respect to the direction of arrangement thereof so that in each line of openings 157, the ends of the adjoining openings 157 overlap each other in the direction of arrangement.

Figure 7B:
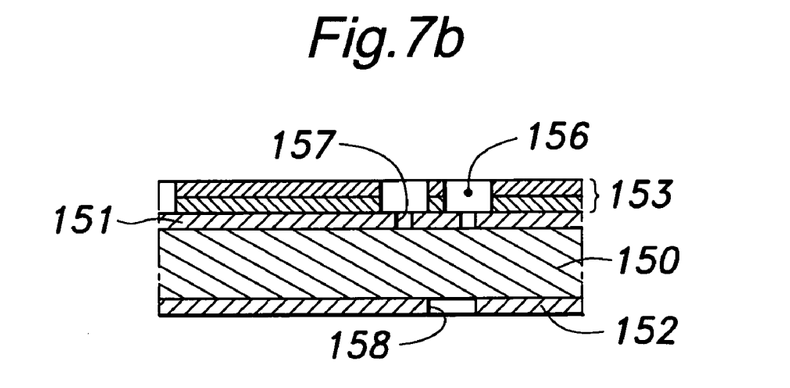
Figure 7C:
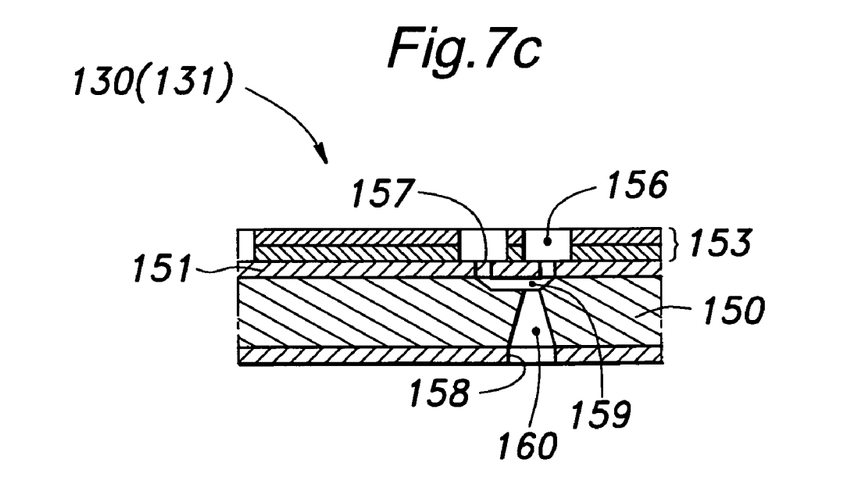

Further, as shown in FIG. 7b, similar etching is performed with a mask (not shown) to remove portions of the silicon nitride film 152 on the underside of the substrate 150 where fluid ports 160 (FIG. 7c) for allowing entrance and discharge to and from the fluid passages 159 provided in the substrate 150 are to be formed.

Finally as shown in FIG. 7c, the substrate 150 is wet etched using an alkali solution such as KOH solution to whereby form the fluid passages 159 and fluid ports 160. Since this process is anisotropic etching, the side wall of each fluid passage 159 and fluid port 160 inclines at an angle reflecting the crystal orientation of the silicon. It should be noted that because the openings 157 of the silicon nitride film 151 on the top surface of the substrate 150 are arranged in a direction of extension of the fluid passages 159 and the openings 157 adjoining in the direction of arrangement partly overlap each other, a continuous fluid passage 159 can be preferably formed under each line of openings 157. Thus, the separator-diffusion layer assembly 130 (131) as shown in FIGS. 2-4 is obtained. As will be understood, the openings 156, 157 in FIG. 7c correspond to the openings 125 in FIGS. 2-4. Also, the upper silicon nitride film 151 functions as the structure reinforcement member 132 shown in the enlarged view in FIG. 2.

Next, with reference to FIGS. 8a-8e, a preferred process for manufacturing the separator-diffusion layer assembly 130a having the feedthrough conductive paths 140 is described hereinafter. In these drawings, portions similar to those in FIGS. 6a-7c are denoted with the same numeral and detailed explanation thereof is omitted.

Figure 8A:
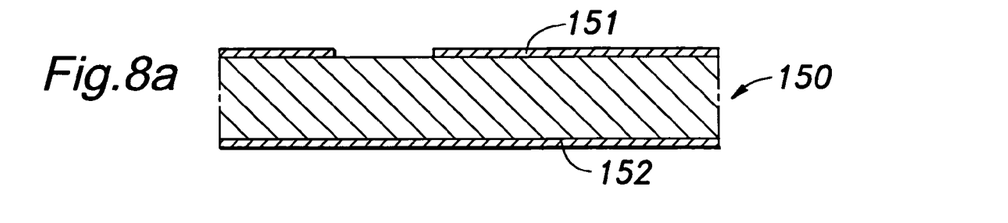
FIGS. 8a-8e are schematic partial cross-sectional views for showing a preferred method for manufacturing the separator-diffusion layer assembly of the fuel cell assembly shown in FIG. 5.

After forming the silicon nitride films 151, 152 on either surface of the silicon substrate 150 in the step of FIG. 6b, etching is conducted with a mask (not shown) to remove portions of the silicon nitride film 151 on top of the substrate 150 where feedthrough conductive paths 162 (FIG. 8d) are to be formed, as shown in FIG. 8a.

Figure 8B:
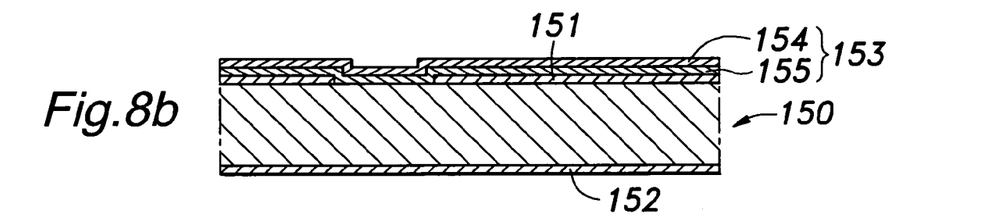
Figure 8C:
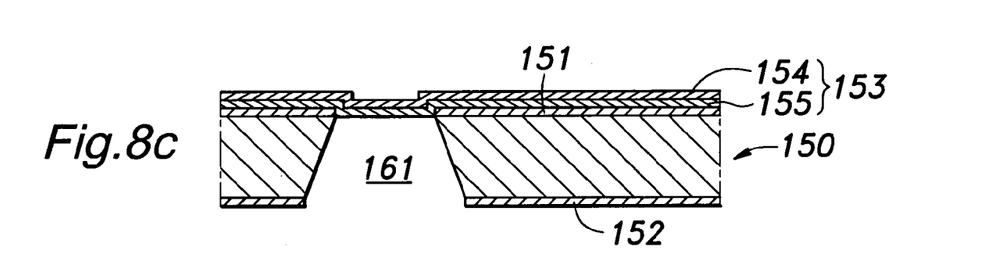

Then, in the step shown in FIG. 8b, the electroconductive film 153 is formed on top of the substrate 150 by vapor deposition, spin coating or the like. As in the above embodiment, the electroconductive film 153 preferably has a two-layered structure comprising the gold layer 154 and the titanium layer 155.

Next, after etching is performed with a mask (not shown) to remove portions of the silicon nitride film 152 on the underside of the substrate 150 where the feedthrough conductive paths 162 (FIG. 8d) are to be formed, wet etching is performed with an alkali solution such as KOH solution to form through holes 161 reaching the electroconductive film 153 covering the top surface of the silicon substrate 150. Since this process is also anisotropic etching, the side wall of each through-hole 161 inclines at an angle reflecting the crystal orientation of the silicon such that the cross-section of each through-hole 161 diverges from the top to under surface of the substrate 150 (or from the first to second surface of the separator 115a).

Figure 8D:
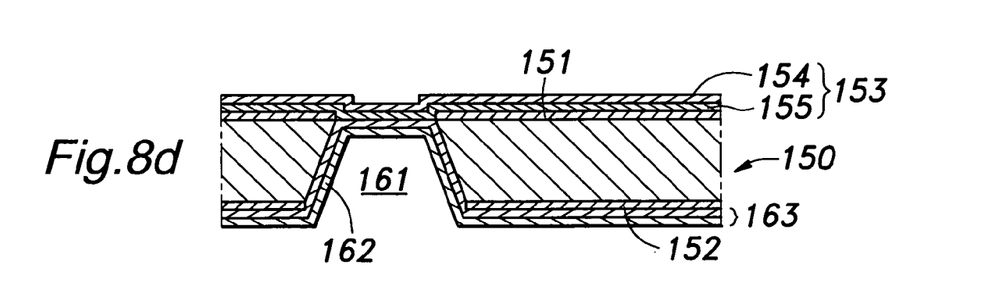

Subsequently, as shown in FIG. 8d, metallic material is deposited from underside the substrate by vapor deposition or the like to form electroconductive films 162, 163, each of which preferably have a two-layered structure comprising a titanium layer adjoining the substrate 150 and a gold layer adjoining the titanium layer, on the side wall of the through-holes 161 and on the under surface of the substrate 150, respectively. The metallic material is also deposited on the underside of the electroconductive film 153 covering the upper opening of the through-holes 161, and thus the electroconductive film 153 and the electroconductive film 162 on the side wall of the through-holes 161 are connected to each other. It should be noted that since the side wall of each through-hole 161 is inclined as described above, the deposition of the metallic material thereon is facilitated so that the sufficiently thick and uniform electroconductive film 162 on the side wall can be preferably achieved. It should be also noted that in the step shown in FIG. 8c, dry etching or other process may be used instead of wet etching to form the through-holes 161 having a vertical side wall. In such a case, however, forming the electroconductive film 162 uniformly on the side wall could become more difficult than in the case where the through-holes 161 are formed by wet etching.

Figure 8E:
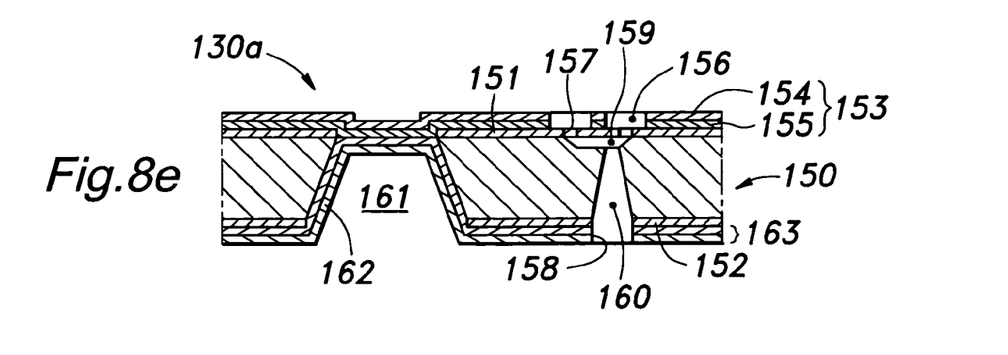

Thus, the electroconductive film 162 on the side wall of each through-hole 161 connects the electroconductive film 153 on top of the substrate 150 and the electroconductive film 163 on the underside of the same. In other words, the electroconductive film 162 on the side wall of each through-hole 161 functions as the feedthrough conductive path 140 shown in FIG. 5. Thereafter, the steps shown in FIGS. 6d-7c are carried out similarly, whereby the fluid passages 159, fluid ports 160, etc. are formed as shown in FIG. 8e, providing the separator-diffusion layer assembly 130a having the feedthrough conductive path 140 (electroconductive film 162) as shown in FIG. 5.

In the above embodiments, the diffusion layer 113 (114) has only a single electroconductive film 133 (153) formed with the openings 125 (156). However, it is possible to stack a plurality of patterned electroconductive films to provide a diffusion layer with complicated fluid paths that can achieve more even diffusion of the fluids. For example, it is possible to form second and third electro conductive films 133a, 133b on the electroconductive film 133 of the separator-diffusion layer assembly 130 (131) shown in FIG. 2 to provide a separator-diffusion layer assembly 203 comprising a diffusion layer 201 having three electroconductive films 133, 133a and 133b.

Figure 9A:
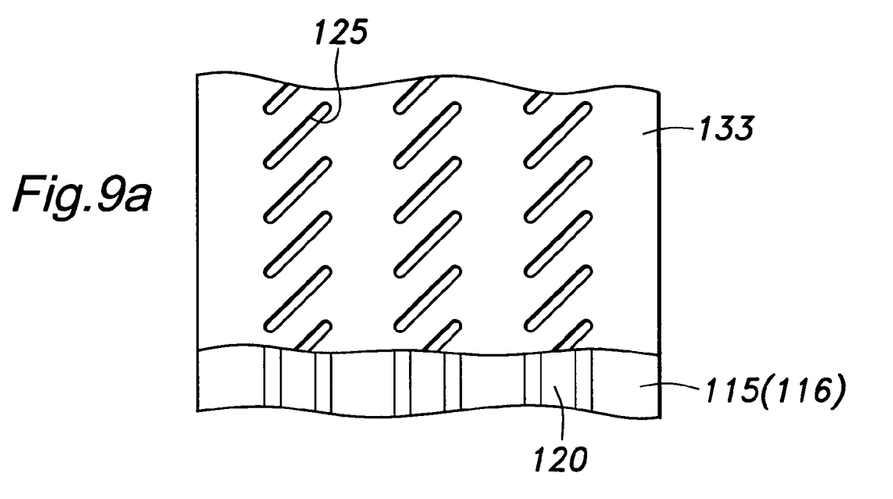
FIGS. 9a-9c are partial plan views for showing three electroconductive films in yet another embodiment of the separator-diffusion layer assembly according to the present invention.
Figure 9B:
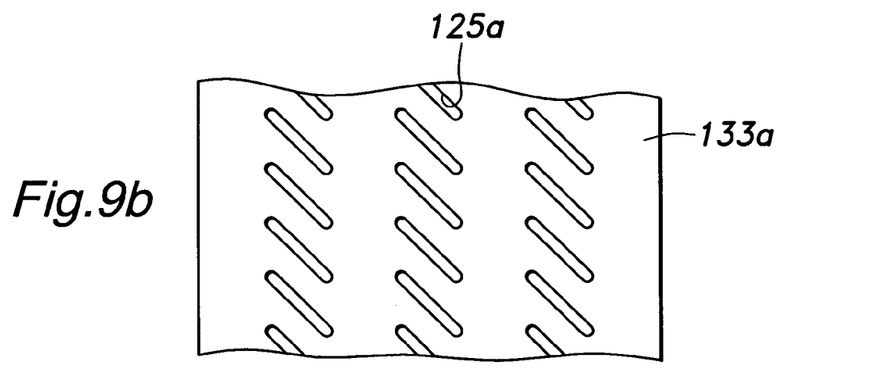
Figure 9C:
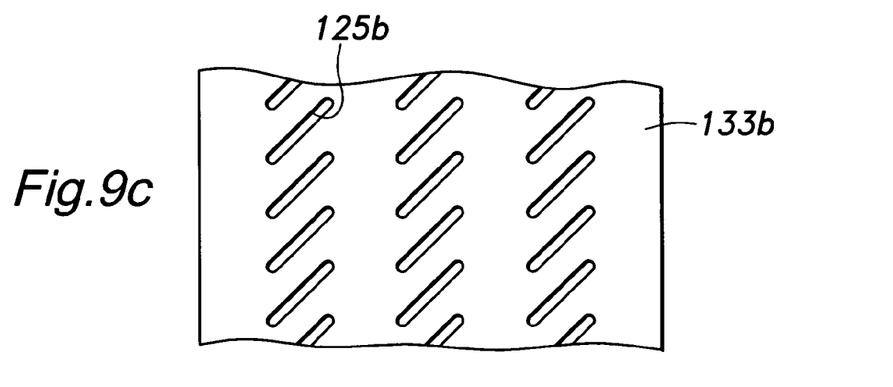

FIGS. 9a-9c show an example of patterning of the electroconductive films 133, 133a and 133b. FIG. 9a is substantially the same as FIG. 3 and shows the shape and arrangement of the openings 125 of the electroconductive film 133 together with the fluid passages 120 of the separator 115 (116). As shown in FIG. 9b, in this embodiment, the second electroconductive film 133a comprises openings 125a of which inclination angle with respect to the direction of extension of the fluid passage 120 is different from that of the openings 125 of the first electroconductive film 133, while as shown in FIG. 9c, the third electroconductive film 133b is formed with openings 125b in the same shape and arrangement as the openings 125 of the first electroconductive film 133.

Figure 10A:
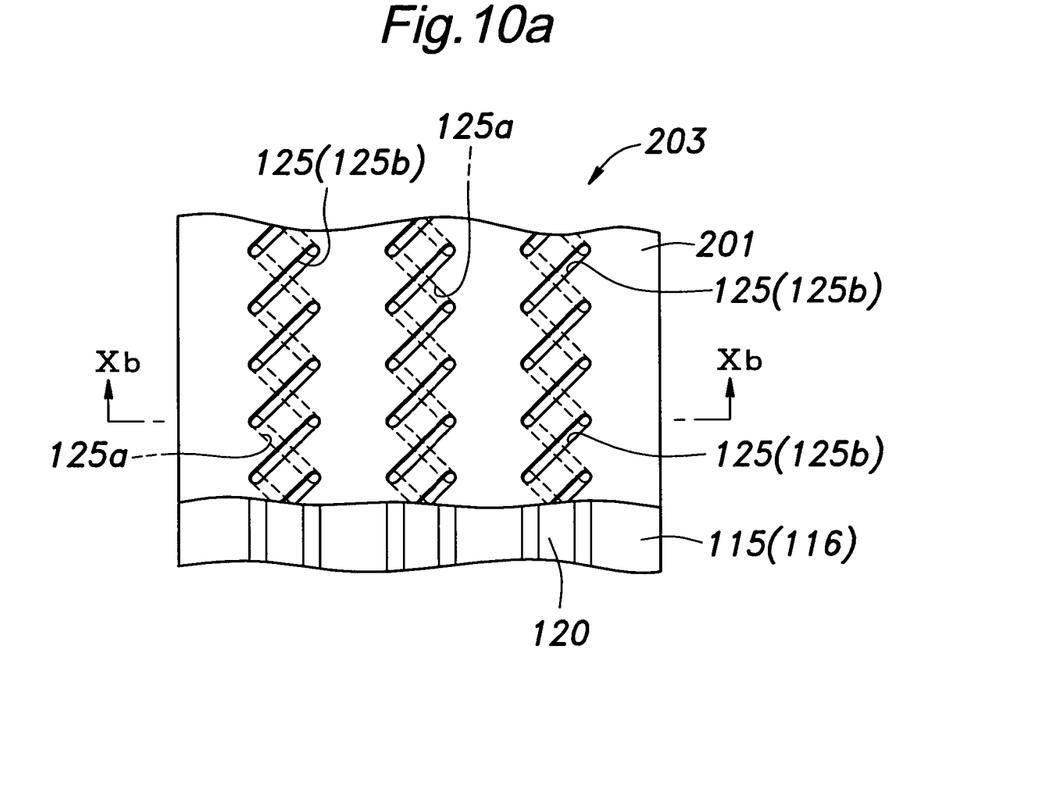
FIG. 10a is a partial plan view showing the overlapping three electroconductive films shown in FIGS. 9a-9c.
Figure 10B:
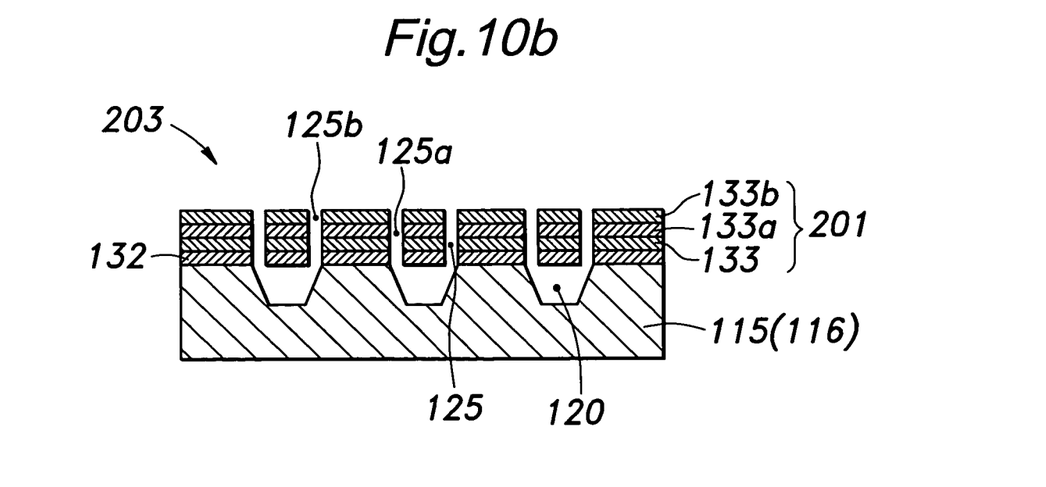

FIG. 10a is a plan view showing the electroconductive films 133, 133a and 133b stacked together, while FIG. 10b shows a cross-sectional view taken along the line Xb-Xb in FIG. 10a. As seen in these drawings, the openings 125 of the first electroconductive film 133 are in flow communication with the openings 125b of the third electroconductive film 133b via the openings 125a of the second electroconductive film 133a to whereby form fluid paths extending through the thickness of the diffusion layer 201. Each opening 125a of the second electroconductive film 133a is in flow communication with a plurality of openings 125 of the first electroconductive film 133 and with a plurality of openings 125b of the third electroconductive film 133b so that the fluid paths assume a complicated labyrinth structure, and thus the fuel fluid or oxidizing fluid in the recess 120 of the separator 115 (116) is favorably diffused over the catalyst electrode layer 111 (112) through the fluid paths.

In the following, with reference to the schematic drawings of FIGS. 11a-11e and FIGS. 12a-12d, a preferred method of manufacturing the above shown separator-diffusion layer assembly 203 having a multiple electroconductive films is described. In these drawings, portions corresponding to those in FIGS. 6a-7c are denoted with same numerals.

Figure 11A:
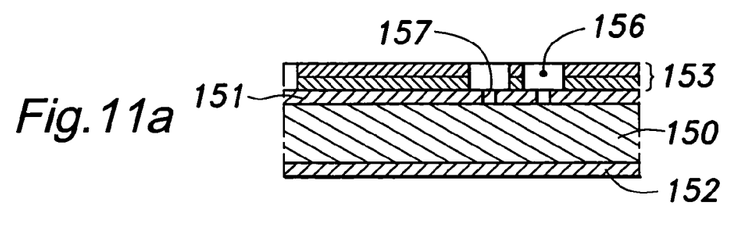
FIGS. 11a-11e are schematic partial cross-sectional views for showing a preferred method for manufacturing the separator-diffusion layer assembly of the fuel cell assembly shown in FIGS. 9a-10b.

First, according to the steps described above with reference to FIGS. 6a-7a, the silicon nitride films 151, 152 are formed on either side of the silicon substrate 150, the electroconductive film (first electroconductive film) 153 containing the gold layer 154 and titanium layer 155 is formed on top thereof, and the first electroconductive film 153 and the silicon nitride film 151 are patterned by etching or the like to form a plurality of openings 156, 157, respectively, as shown in FIG. 11a.

Figure 11B:
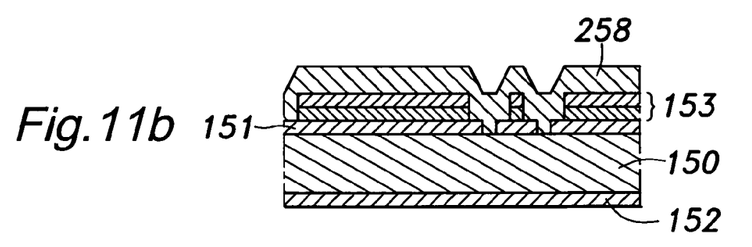

In a step shown in FIG. 11b, a sacrifice layer 258 consisting of silicon oxide ($SiO_2$), for example, is formed to fill in the openings 157 of the upper silicon nitride film 151 and the openings 156 of the first electroconductive film 153 with the sacrifice layer 258.

Figure 11C:
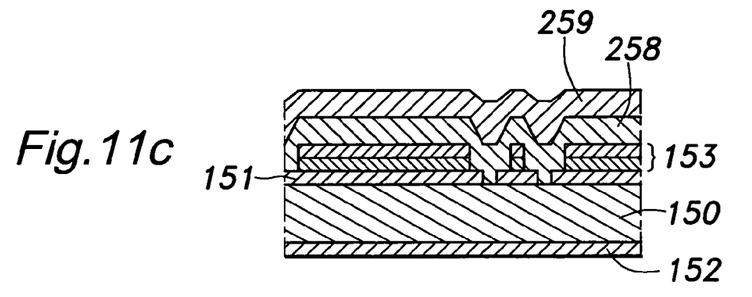
Figure 11D:
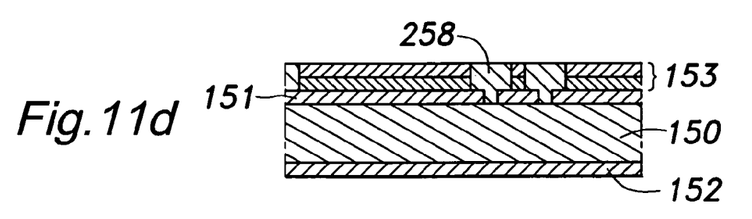

Further, after forming a resist 259 on the sacrifice layer 258 as shown in FIG. 11c, the resist 259 and the sacrifice layer 258 are etched by dry etching until the top surface of the first electroconductive film 153 is exposed, to thereby flatten the top surface.

Figure 11E:
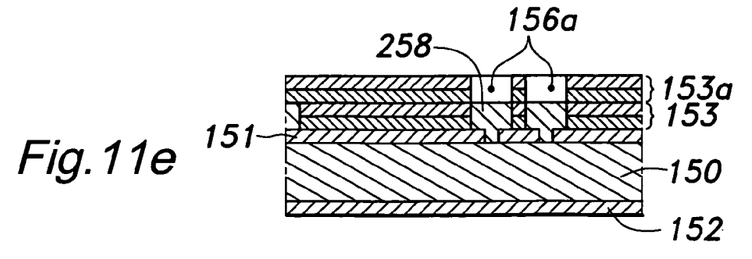
Figure 12A:
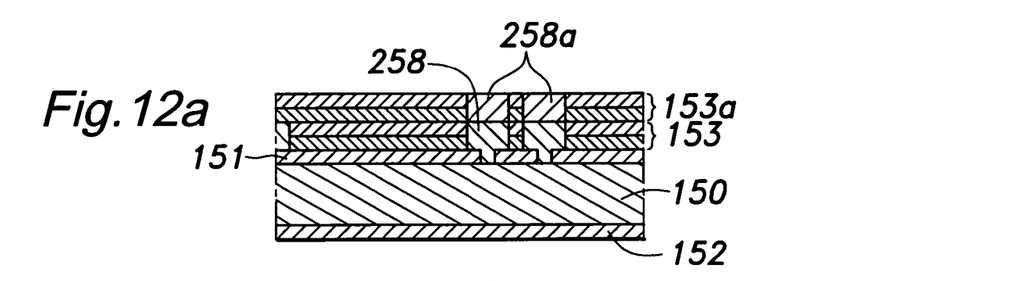
FIGS. 12a-12d are schematic partial cross-sectional views for showing a preferred method for manufacturing the separator-diffusion layer assembly of the fuel cell assembly shown in FIGS. 9a-10b.

Then, by using the steps as described above, a second electroconductive film 153a is formed on the flattened top surface, and patterned to form a plurality of openings 156a, as shown in FIG. 11e. Further, by the steps similar to those shown in FIGS. 11b-11d, the openings 156a of the second electroconductive film 153a is filled with a sacrifice layer 258a, a resist (not shown) is formed thereon, and etching is conducted to flatten the top surface (FIG. 12a).

Figure 12B:
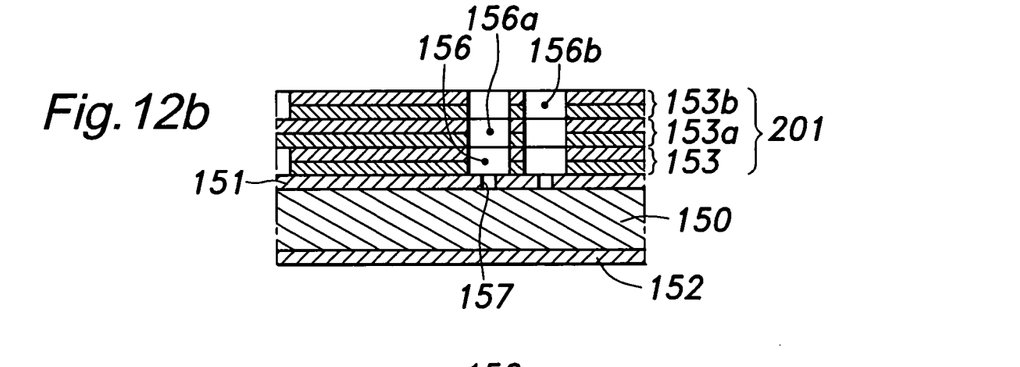
Figure 12C:
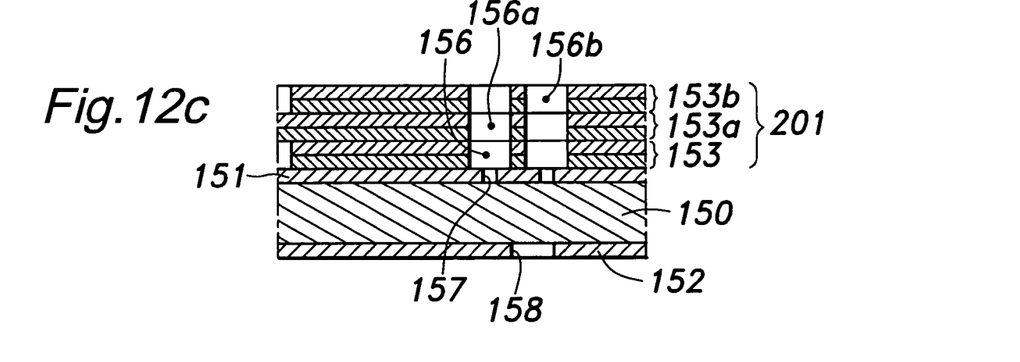

Further, after a third electroconductive film 153b is formed and patterned to form openings 156b by again using the above-described steps, etching is performed to remove the sacrifice layer 258 filling in the openings 157 of the silicon nitride film 151 and the openings 156 of the first electroconductive film 153 as well as the sacrifice layer 258a filling in the openings 156a of the second electroconductive film 153a, as shown in FIG. 12b. This brings the openings 156, 156a, 156b of the electroconductive films 153, 153a, 153b as well as the openings 157 of the silicon nitride film 151 into flow communication so that the flow paths extending through the diffusion layer 201 is formed.

Figure 12D:
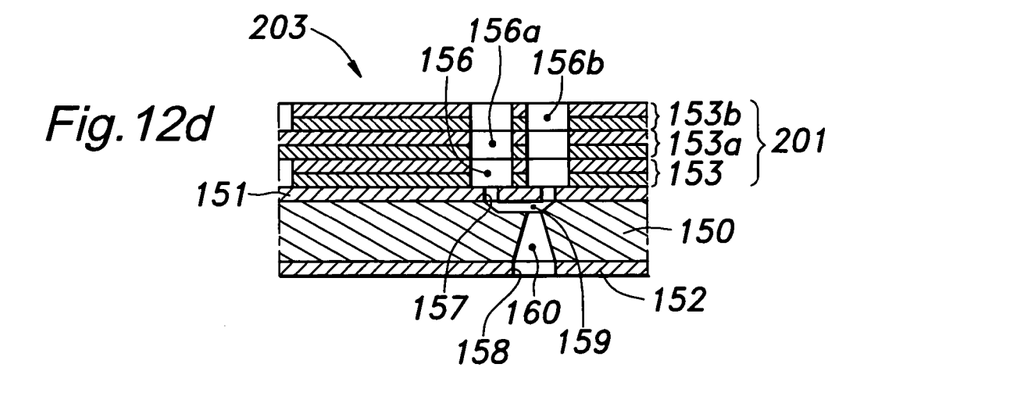

Finally, as shown in FIG. 12d, the silicon substrate 150 is wet etched by using a KOH solution to form the fluid passages 159 and fluid ports 160, to thereby obtain the unitary separator-diffusion layer assembly 203. In this step, the etchant can reach the surface of the silicon substrate 150 through the openings 156, 156a, 156b of the electroconductive films 153, 153a, 153b as well as the openings 157 of the silicon nitride film 151 that form the fluid paths extending through the diffusion layer 201. Thus, the etching of the substrate 150 can be favorably carried out even with the unitarily formed diffusion layer 201.

Although the present invention has been described in terms of preferred embodiments thereof, it is obvious to a person skilled in the art that various alterations and modifications are possible without departing from the scope of the present invention which is set forth in the appended claims. For instance, though in the above embodiments the deposited electroconductive film is patterned by etching, an electroconductive film having a predetermined pattern can be also obtained by photolithography, lift-off, etc. Also, in the above embodiments, the electroconductive film and the structure reinforcement member of the diffusion layer formed integrally with the separator are provided with a plurality of openings arranged along each fluid passage (recess) of the separator such that the opening each have an elongated shape and are inclined with respect to the direction of arrangement thereof. However, the shape of the opening can vary in a variety of ways, and may have a V-shape or W-shape, for example. In such cases also, it is preferred that the openings adjoining in the direction of arrangement partially overlap each other because fluid passages extending along the direction of arrangement of the openings can be readily obtained by etching the separator using such openings as etching windows.

INDUSTRIAL APPLICABILITY

As described above, according to the present invention, the diffusion layer of the fuel cell assembly comprises an electroconductive film integrally formed with the separator so that the separator and the diffusion layer constitute a unitary separator-diffusion layer assembly. This can eliminate the need for applying a large external pressure for making the separator and the diffusion layer closely contact with each other. This also reduces the pressure applied on other component parts in the fuel cell assembly, decreasing the required mechanical strength and the manufacturing cost. The integrated diffusion layer and the separator also reduce the number of component parts and manufacturing steps. Further, by forming the electroconductive film using a film forming process used in a semiconductor or micromachine manufacture, it is possible to achieve a very thin diffusion layer comprising the electroconductive film, which contributes to minimizing the dimension (thickness) of the resulting fuel cell assembly.

What is claimed is:

1. A fuel cell assembly, comprising:
an electrolyte layer;
a pair of catalyst electrode layers interposing said electrolyte layer therebetween;
a pair of separators each having a first surface facing said electrolyte layer and a second surface opposite to said first surface, said first surface of each of said separators being provided with a recess through which a fuel fluid or an oxidizing fluid flows to contact an associated one of said catalyst electrode layers; and
a pair of diffusion layers each being disposed between said first surface of an associated one of said separators and an associated one of said catalyst electrode layers, wherein each of said diffusion layers comprises an electroconductive film formed integrally with said associated separator so as to form a separator-diffusion layer assembly in cooperation with said associated separator, wherein each diffusion layer is formed with a plurality of fluid paths extending therethrough in a direction of its thickness so as to be in flow communication with said recess of said associated separator and thereby diffuse said fluid flowing in said recess over a surface of said associated catalyst electrode layer, wherein said plurality of fluid paths of each diffusion layer comprises a plurality of openings formed in said electroconductive film of said diffusion layer over said recess of said associated separator, wherein said recess of each separator extends in a prescribed direction and said plurality of openings of said electroconductive film associated with each separator are arranged in a direction of extension of said recess to form a line of openings in such a manner that adjacent openings in said line of openings partially overlap each other in a direction of extension of said line of openings.

2. A fuel cell assembly, comprising:
an electrolyte layer,
a pair of catalyst electrode layers interposing said electrolyte layer therebetween;
a pair of separators each having a first surface facing said electrolyte layer and a second surface opposite to said first surface, said first surface of each of said separators being provided with a recess through which a fuel fluid or an oxidizing fluid flows to contact an associated one of said catalyst electrode layers; and
a pair of diffusion layers each being disposed between said first surface of an associated one of said separators and an associated one of said catalyst electrode layers, wherein each of said diffusion layers comprises an electroconductive film formed integrally with said associated separator so as to form a separator-diffusion layer assembly in cooperation with said associated separator, wherein each diffusion layer is formed with a plurality of fluid paths extending therethrough in a direction of its thickness so as to be in flow communication with said recess of said associated separator and thereby diffuse said fluid flowing in said recess over a surface of said associated catalyst electrode layer, wherein said plurality of fluid paths of each diffusion layer comprises a plurality of openings formed in said electroconductive film of said diffusion layer over said recess of said associated separator, wherein each diffusion layer comprises a plurality of electroconductive films wherein each of said plurality of electroconductive films is formed with a plurality of openings in such a manner that said openings of each electroconductive film are in flow communication with said openings of its adjacent electroconductive film(s) to form said plurality of fluid paths of said diffusion layer.

3. A fuel cell assembly, comprising:
an electrolyte layer;
a pair of catalyst electrode layers interposing said electrolyte layer therebetween;
a pair of separators each having a first surface facing said electrolyte layer and a second surface opposite to said first surface, said first surface of each of said separators being provided with a recess through which a fuel fluid or an oxidizing fluid flows to contact an associated one of said catalyst electrode layers; and
a pair of diffusion layers each being disposed between said first surface of an associated one of said separators and an associated one of said catalyst electrode layers, wherein each of said diffusion layers comprises an electroconductive film formed integrally with said associated separator so as to form a separator-diffusion layer assembly in cooperation with said associated separator, wherein each diffusion layer is formed with a plurality of fluid paths extending therethrough in a direction of its thickness so as to be in flow communication with said recess of said associated separator and thereby diffuse said fluid flowing in said recess over a surface of said associated catalyst electrode layer, wherein said plurality of fluid paths of each diffusion layer comprises a plurality of openings formed in said electroconductive film of said diffusion layer over said recess of said associated separator, wherein each diffusion layer comprises a structure reinforcement member disposed between said electroconductive film and said associated separator.

4. A fuel cell assembly according to claim 3, wherein each separator comprises a silicon substrate and said structure reinforcement member consists of a silicon nitride layer or a silicon oxide layer.

5. A fuel cell assembly according to claim 3, wherein said plurality of fluid paths of each diffusion layer comprises a plurality of openings formed in said structure reinforcement member of said diffusion layer.

6. A fuel cell assembly according to claim 5, wherein said recess of each separator extends in a prescribed direction and said plurality of openings of said structure reinforcement member associated with each separator are arranged in a direction of extension of said recess to form a line of openings in such a manner that adjacent openings in said line of openings partially overlap each other in a direction of extension of said line of openings.

* * * * *